United States Patent
Casayas

[11] Patent Number: 5,996,747
[45] Date of Patent: Dec. 7, 1999

[54] AUTOMATIC-RETURN HYDRAULIC DEVICE, ESPECIALLY FOR VEHICLE SEATS

[76] Inventor: Juan Singla Casayas, Calle del Drive Tiffonz, E-08100 Martorelles, Spain

[21] Appl. No.: 08/718,344

[22] PCT Filed: Jan. 26, 1996

[86] PCT No.: PCT/ES96/00012

§ 371 Date: Nov. 4, 1996

§ 102(e) Date: Nov. 4, 1996

[87] PCT Pub. No.: WO96/23987

PCT Pub. Date: Aug. 8, 1996

[30] Foreign Application Priority Data

Jan. 31, 1995 [ES] Spain ..................... 9500215

[51] Int. Cl.[6] ................. F16F 9/32; F16F 5/00; F16F 9/43; B60G 13/00
[52] U.S. Cl. ............... 188/300; 188/322.21; 188/317; 267/221
[58] Field of Search ................... 188/300, 312, 188/322.21, 319.2, 317; 267/219, 221, 222, 64.12; 297/452.65, 232; 156/301.2

[56] References Cited

U.S. PATENT DOCUMENTS

| 3,256,961 | 6/1966 | Carbon | 188/88 |
|---|---|---|---|
| 3,477,550 | 11/1969 | Suzuki et al. | 188/300 |
| 3,533,658 | 10/1970 | Gropp et al. | 297/355 |
| 3,630,324 | 12/1971 | Stretten | 188/312 |
| 3,659,684 | 5/1972 | Porter | 188/322 |
| 3,837,445 | 9/1974 | Pierle | 188/322 |
| 4,420,989 | 12/1983 | Finkle | 188/312 X |
| 4,427,188 | 1/1984 | Shimokura | 267/64.12 |
| 4,485,900 | 12/1984 | Kato et al. | 188/282 |
| 4,741,516 | 5/1988 | Davis | 188/312 X |
| 4,981,199 | 1/1991 | Tsai | 188/312 |
| 5,102,193 | 4/1992 | Goss et al. | 297/355 |

FOREIGN PATENT DOCUMENTS

| 2026331 | 4/1992 | Spain . |
| 1703886 | 1/1992 | U.S.S.R. . |

*Primary Examiner*—Robert J. Oberleitner
*Assistant Examiner*—Jeffrey Woller
*Attorney, Agent, or Firm*—Steinberg & Raskin, P.C.

[57] ABSTRACT

The device comprises a cylinder (1) which is divided in two variable volume chambers (3,4) by a piston (2,2'), which has conduits (5,5') for the passage of a fluid from one chamber to the other, and spring means (15) for pushing the piston in a predetermined direction, tending to cause a pressure increase in one of the chambers; the piston is mounted on a rod formed of two aligned rod elements (7,8), with means (9) for bringing closer and separating their adjacent extremities; it comprises means for providing a controlled fluid leak through the conduits (5,5') of the piston, said means consisting of a groove (25) provided in the piston (2') or washers (12,13) which can be deformed due to the existence of an undercut (33) in one of the rod elements. It provides for the automatic return of the seat and/or the back of the seat to a predetermined position when the passenger leaves the seat.

24 Claims, 6 Drawing Sheets

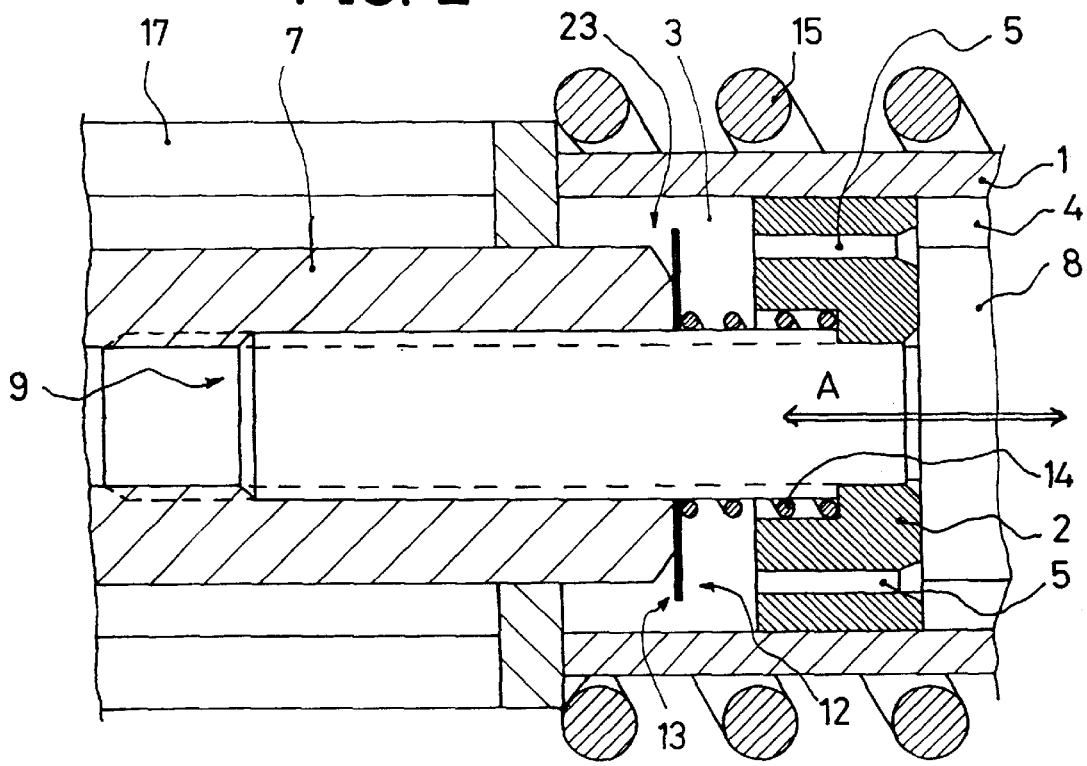
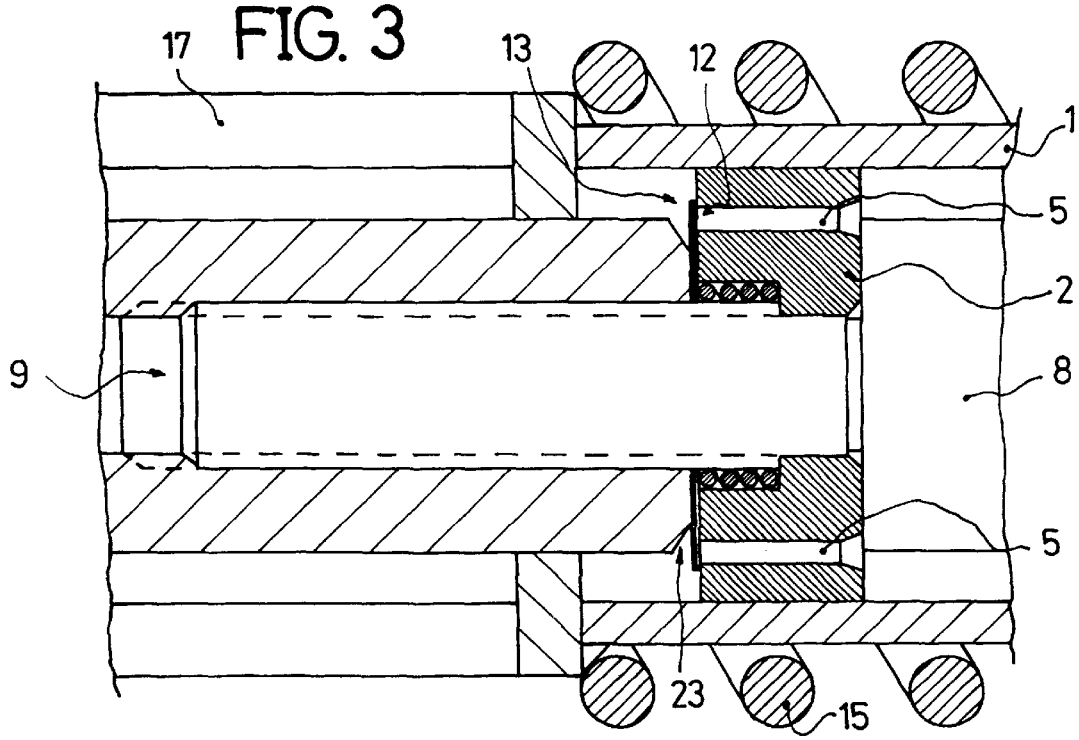

AUTOMATIC-RETURN HYDRAULIC DEVICE, ESPECIALLY FOR VEHICLE SEATS

The present invention relates to an automatic-return hydraulic device, especially for vehicle seats, which permits the backrest of each seat to return by itself to the vertical position from any inclined position, and/or any seats which have been moved laterally to return to their initial position, when the passengers leave the seats.

BACKGROUND OF THE INVENTION

In most omnibuses, coaches railway wagons and other means of collective transport, passengers can for their greater comfort incline the backrests of their seats at will; it is also possible in some cases to move the seat laterally towards the gangway, in order to move it further away from the adjacent seat and thus make more room available.

Once the passengers have left the vehicle it is advisable to return each of the seats to its initial position, an operation which is mostly performed manually by the driver of the coach or the ticket inspector, with the attendant loss of time.

Systems have been developed to allow the driver to carry out this operation for all the seats at once, but such systems involve a system of electrical control for each seat and a connection to the driver's position, and therefore represent a very high cost in materials, equipment and labor for fitting.

DESCRIPTION OF THE INVENTION

The objective of the present invention is to solve the mentioned drawback, by means of an intelligent hydraulic device capable of returning the seat automatically to a predetermined initial position, once the passenger has left the seat, and which has low cost.

In accordance with tis objective, this invention presents an automatic-return hydraulic device, especially for vehicle seats, comprising a fluidtight cylinder, which is divided into two chambers of variable volume by a piston, which has at least one conduit for the passage of a fluid from one chamber to the other, a rod upon which said piston is mounted, and elastic means for biasing the rod and therefore the piston in a predetermined direction, which tends to cause an increase of pressure in one of the chambers, and is characterized in that said rod is constituted by two aligned rod members, to one of which the piston is attached, said rod members being provided with means for mutual adjustable coupling in order to move their adjacent ends towards each other and apart from each other, and in that means are provided to allow a controlled leak of fluid through said at least one conduit of the piston from one chamber to the other under the action of said elastic means.

By virtue of these characteristics, when no outer force is applied the mechanism returns slowly to a predetermined position: for example, if the device is applied to the backrest of a coach seat, the backrest returns to the vertical position from any intermediate position when the passenger leaves the seat.

Advantageously, said means of adjustable mutual coupling include a threaded spigot provided at one end of one of the rod members, which cooperates with a threaded bore provided on the adjacent end of the other rod member, and means to provoke at the will of the user the rotation of one of said members in such a way that the adjacent ends of both members move away from each other thus totally opening the conduits for a passage of fluid between the chambers.

When the passenger wishes to change the position of the seat or backrest, he acts upon the threaded connection and frees the passage of fluid between the chambers, in such a way that the seat or backrest can be moved to any desired position.

In one embodiment of the invention, said means for allowing a controlled leak of fluid include means for opening and closing the piston conduits when the adjacent ends of the rod members move away from each other and towards each other, respectively, constituted by at least a washer of elastically flexible material fitted around one of the rod members and adjacent to said piston, and an undercut formed on the end of the other rod member, which allows the elastic deformation of the washer(s) as a consequence of a pressure increase in one of the chambers.

In this embodiment the controlled escape of fluid can occur only in one direction, which could for example correspond to movement of the backrest from its inclined position towards its vertical position.

Advantageously, the device includes two of said washers arranged adjacently to one another: this arrangement with two washers permits a good combination of elasticity and strength.

The washers are preferably made of quench-hardened steel for springs.

In an embodiment of the device with two washers of quench-hardened steel for springs, the washers can have thicknesses of around 0.1 mm and 0.3 mm respectively.

Advantageously, the device includes an inner spring fitted between a cavity of the piston and the washers. This spring allows the washers to move away from the fluid-passage conduits when the passenger causes one rod member to move away from the other rod member.

In an alternative embodiment of the invention, said means for allowing a controlled leak of fluid include a radial groove formed in the piston, which connects one end of the fluid-passage conduit with one of said chambers.

In this case, the escape of fluid can take place in both directions: for example, if the passenger leaves the seat the backrest will return slowly to the initial position, but if the passenger pushes the backrest forcibly it can also be made to incline slowly. This embodiment has the advantage of being constructionally simpler.

Preferably, in this alternative embodiment, the conduit for the passage of fluid between one chamber and the other is inclined with respect to the axis of the piston, with one of its ends always in communication with one of said chambers and its opposite end closed over most of its surface by the end of one of the rod members, and in communication with the other of said chambers solely through said groove, in the absence of outer forces on the device.

In accordance with an important aspect of the device of the invention, which is of the type which further includes means for the filling of fluid to the inside of said cylinder and fluidtight closure means for the unit once the filling operation has been completed, said means for the filling of fluid comprise an axial through-orifice provided on one of the rod members and a longitudinal undercut formed in the threaded spigot of the other rod member, while said fluidtight closure means include a ball which fits against a suitable seat machined inside said axial through-orifice, and a bolt for tightening the ball against said seat.

Filling of the cylinder is facilitated by the longitudinal undercut in the threaded spigot, and the fluidtight closure system by means of a ball is much faster and reliable than the traditional systems which use screws fitted with seals.

BRIEF DESCRIPTION OF THE DRAWINGS

For a better understanding of all that has been outlined, some drawings are attached which, schematically and solely by way of non-restrictive example, show a practical case of embodiment.

In said drawings:

FIGS. 2 to 5 are schematic views, on an enlarged scale, of a detail of the device of FIG. 1, in different operating positions;

DESCRIPTION OF PREFERRED EMBODIMENTS

Figure 1:
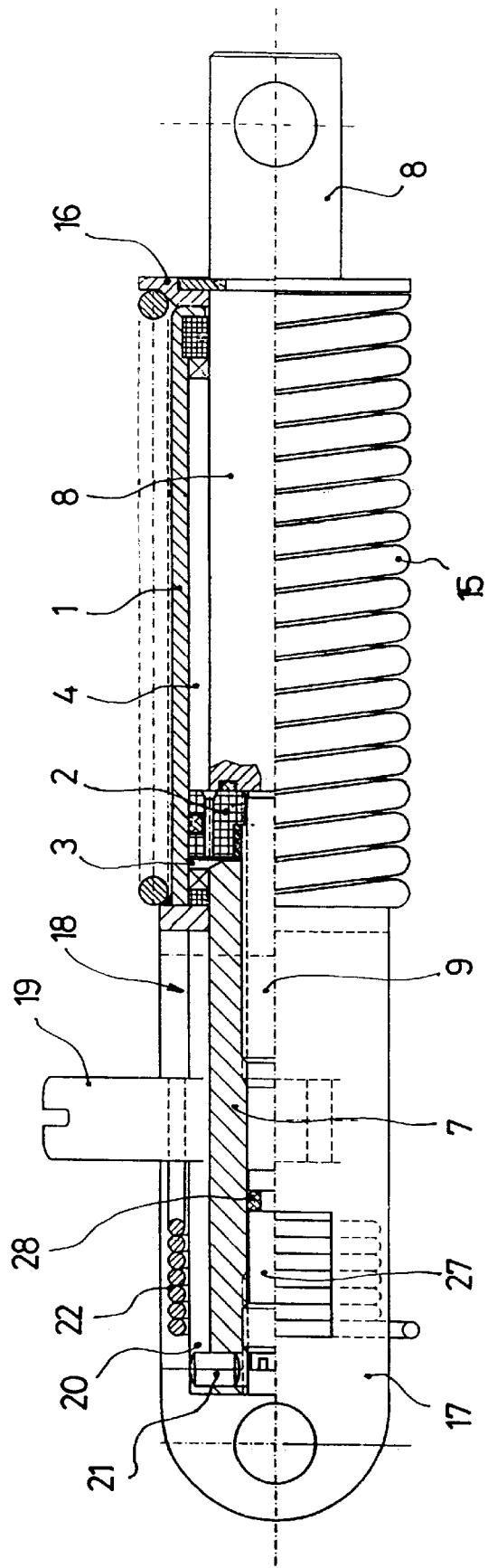
FIG. 1 is a partially sectioned elevation view of a first embodiment of the device of the invention.

As shown in FIG. 1, in a first embodiment the device of the invention comprises a fluidtight cylinder 1, which contains a suitable fluid such as oil, inside which can slide a piston 2, which divides the cylinder 1 into two chambers 3 and 4 of variable volume.

The piston 2 is provided with longitudinal conduits 5 for the passage of the fluid from one chamber to the other, and is mounted on a rod 6, constituted by two rod members 7 and 8 whose free ends project from the cylinder 1; in the example show the piston is attached to the rod member 8.

The free end of the rod member 8 is associated with the backrest of a multi-position seat (not shown), in such a way that, in the position shown in FIG. 1 the backrest of the seat is in the position of maximum inclination, while when the piston 2 and the rod member 8 move towards the right in FIG. 1 the backrest straightens up until it reaches a substantially vertical position.

The rod members 7 and 8 are coupled to each other by means of a threaded connection 9, formed by a female thread 10 formed in the end of member 7 and a male thread 11 machined in the end of member 8. This threaded connection is, for example, of the four-thread type, such that when one of the rod members is subjected to a small rotating movement the two members move away from each other.

As can be better appreciated in FIG. 2, which shows the region of the piston 2 and of the threaded connection 9 with the ends of the rod members 7 and 8 spaced apart from each other, some washers are interposed between the rod members 7 and 8, said washers in the embodiment shown being two in number 12, 13 fitted loosely around the rod in the region of the threaded connection 9. These washers close off the conduits 5 of the piston in order to prevent the passage of oil between the chambers 3 and 4.

A spring 14 is arranged in a cavity formed inside the piston 2, in such a way that it is compressed between the piston itself and the washers 12,13. This inner spring 14 has the function of keeping the washers 12,13 against the end of the rod member 7 when the latter is moved away from the rod member 8 (see FIG. 2).

Ouside the cylinder 1 is mounted an outer or return spring 15, which rests on one side against a projection of the cylinder itself and on the other side against a plate 16 attached to the rod member 8; this spring 15 therefore tends to move the rod 7,8 and the piston 2 towards the right of the figures, that is, to push the rod member 8 outside the cylinder 1. In FIG. 1, the spring 15 is shown in its state of maximum compression.

FIG. 1 likewise shows a housing 17, attached to the cylinder 1, inside which can slide the rod member 7 with the interposition of a release bushing 18. This bushing is provided with a blade 19 which is actuated by the passenger to release the device and to move the position of the seat, and a longitudinal groove 20 in which can slide a radial pivot 21 integral with the rod member 7; when the passenger actuates the blade 19 the bushing 18 rotates, pulling the pivot 21 and therefore making the rod member 7 rotate, as will be mentioned below in describing the operation of the device.

In the absence of outer forces (exercised by the passenger), a torsion spring 22 keeps the release bushing 18 in an inactive position.

In accordance with the invention, the end of the rod member 7 adjacent to rod member 8 has an undercut or bevel 23 (FIG. 2), which allows a slight deformation of the washers 12,13 in order to open the oil passage between chamber 4 and chamber 3 through the conduits 5, as will be described below.

Figure 5:
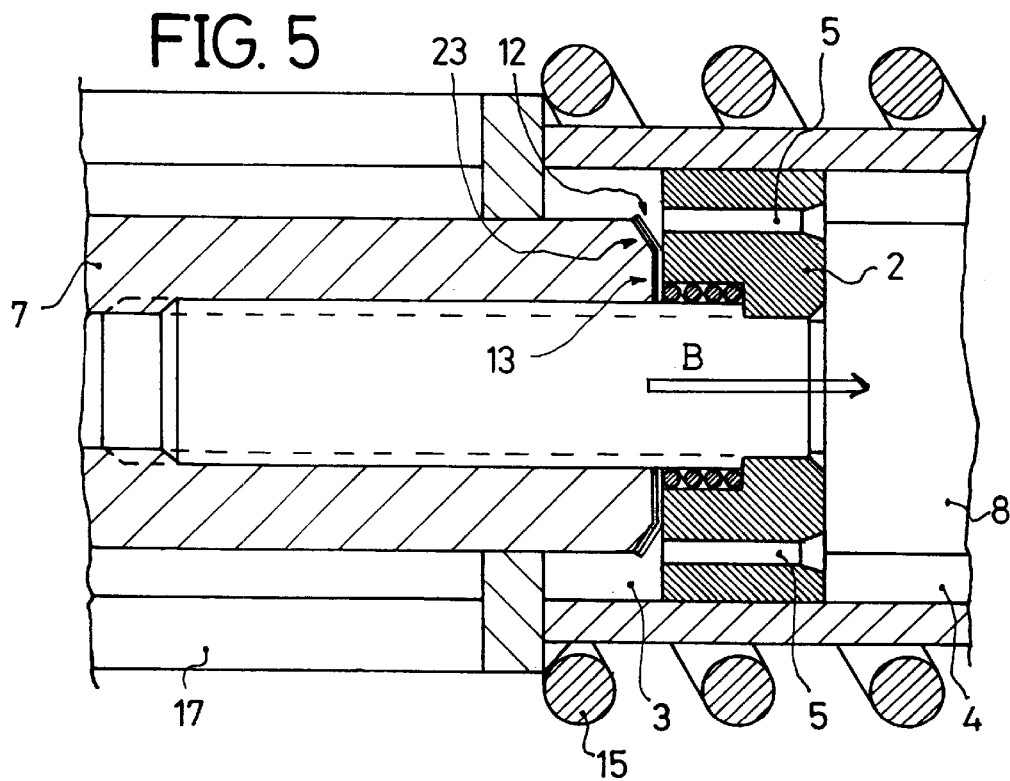

The washers 12 and 13 are of a relatively flexible material, such as quench-hardened steel for springs, and are designed in such a way that they can deform, as shown in FIG. 5, and return subsequently to their original shape.

In one example of embodiment, the washers 12 and 13 are of F-2131 steel UNE standards NO 36021) of 0.1 mm and 0.3 mm thickness, respectively. However, as will be appreciated from the description of the operation of the device, the dimensions of the washers are related with those of the return spring 15.

Instead of two washers:, it may in other cases be advisable to have a single washer, or even three washers of suitable dimensions, always bearing in mind that the objective is that the washers deform when the pressure in the chamber 4, due to tension of the spring 15, is not counteracted by an outer force, which will normally be the weight of passenger leaning against the backrest of the seat, and return to their position once the oil has passed from chamber 4 to chamber 3 and the piston 2 has in consequence moved from the position shown in FIG. 1 to the opposite end of the cylinder 1.

In addition to the parts described, FIG. 1 also shows a number of complements usual in hydraulic devices, such as fluidtight gaskets, snap rings, etc., which have not been numbered to avoid complicating the drawing.

A description will be provided blow, by way of example, of the operation of the device of the invention, with particular reference to FIGS. 2 to 5, when the device is associated with adjusting the position of the backrest of a multi-position coach seat; the person skilled in the art will nevertheless appreciate that the same device can be applied in a similar way to adjust the lateral position of a seat.

When the backrest of the seat is in vertical position, the piston 2 is situated at the right end of the cylinder 1, in such a way that chamber 3 has a maximum volume and chamber 4 has a minimum volume. The spring 15 is extended and exerts little force. The oil cannot pass from chamber 3 to chamber 4 because the washers 12,13 block off the passage conduits 5 of the piston 2.

In this situation, if a passenger wishes to incline the backrest of the seat he acts upon a lever (not shown) connected to the blade 19 of the actuating bushing 18 (FIG. 1), in such a way that the bushing rotates and drags in a rotating movement the rod member 7 (by means of the pivot 21 which is coupled in the groove 20 of the bushing). The rotation of the rod member 7 causes it to draw away from the rod member 8, due to the threaded connection 9 which exists between the two members; in consequence, as shown in FIG. 2, the washers 12,13 move away from the passage conduits 5 driven by the spring 14, and oil can flow from chamber 3 to chamber 4 if the passenger exerts a force on the backrest (which is transmitted to the free end of the rod member 8).

FIG. 2 shows an intermediate position of the backrest at a time when the passenger is keeping the release bushing rotated: as indicated by the arrow A, the rod will move towards the left of the figure (and the backrest will incline further) if the passenger pushes the backrest, or else it will move towards the right of the figure (and the backrest will move towards a more vertical position) if the passenger stops exerting force, because the rod is subjected to the force of the return spring 15.

Figure 4:
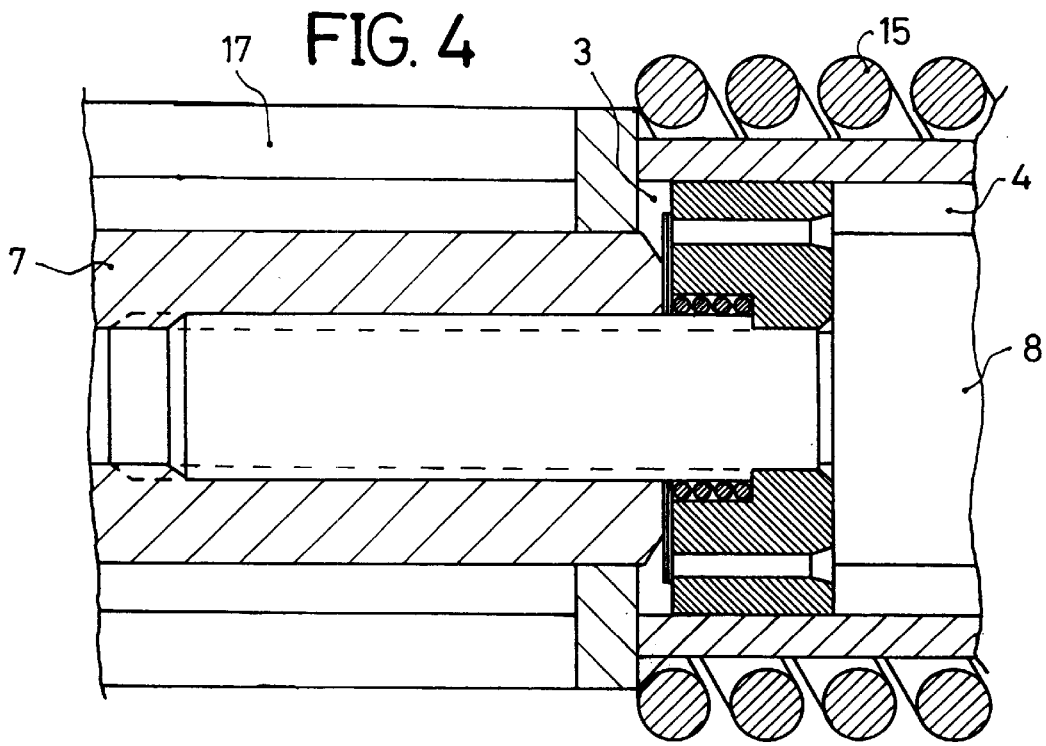

Once the passenger has set the desired inclination of the backrest, for example an intermediate position, he releases the lever associated with the release bushing 18, and the torsion spring 22 (FIG. 1) returns the bushing, and therefore the rod member 7, to its initial position: the two rod members 7 and 8 approach each other once again and the washers 12,13 close off the conduits 5 of the piston 2, in such a way that the passage of oil between the two chambers 3,4 is no longer possible and the backrest is locked in the desired position. This situation is shown in FIGS. 3 and 4, which correspond to an intermediate position and a totally inclined position of the backrest, respectively. As can be appreciated, in the position of FIG. 4 the return spring 15 is totally compressed.

In this situation, the spring 15 is exerting a force towards the right, on the rod member 8, through the plate 16, which tends to push the oil from chamber 4 towards chamber 3; however, while the passenger remains in the seat, the force exerted by the passenger's back on the backrest (which is converted into a force towards the left on the rod member 8) is sufficient to counteract the force of the spring 15, and the backrest remains inclined.

When the passenger leaves the seat, the force of the spring 15 is no longer counteracted, and it gradually overcomes the resistance of the washers 12, 13, which deform (due to the existence of the undercut 23) as shown in FIG. 5, and allow the passage of oil from chamber 4 towards chamber 3, such that the rod moves towards the right as indicated by arrow B and the backrest slowly returns to the vertical position.

The return time of the backrest to the vertical position can be regulated with a suitable design of the return spring and of the number and resistance of the washers.

FIGS. 6 to 9 relate to a second embodiment of device In these figures, the parts equivalent to those of the device shown in FIGS. 1 to 5 retain same reference numbers.

Figure 6:
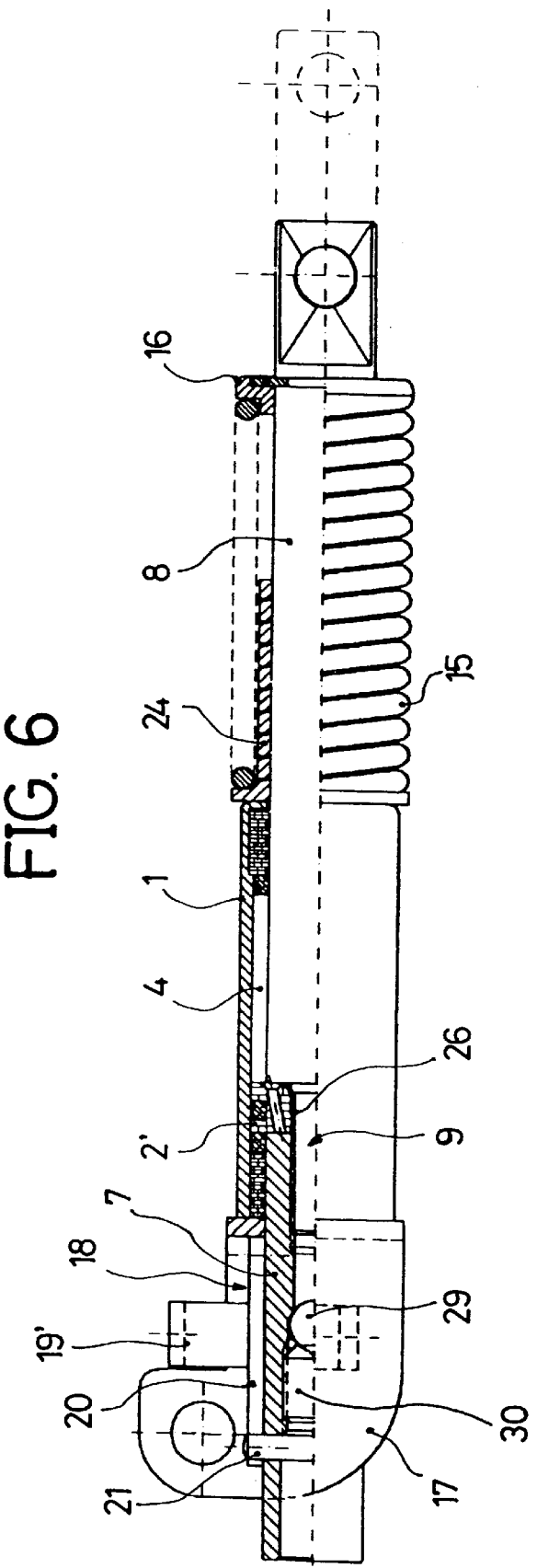
FIG. 6 is an elevation view similar to that of FIG. 1 of a second embodiment of the device of the invention.

In this second embodiment, as shown in FIG. 6, the rod member 8 is longer, and the spring 15 is fitted directly around the latter, with interposition of a guide bushing 24.

The main difference, however, between this second embodiment and the one described previously consists in the means to permit the controlled leak of fluid between chambers 3 and 4.

Figure 7:
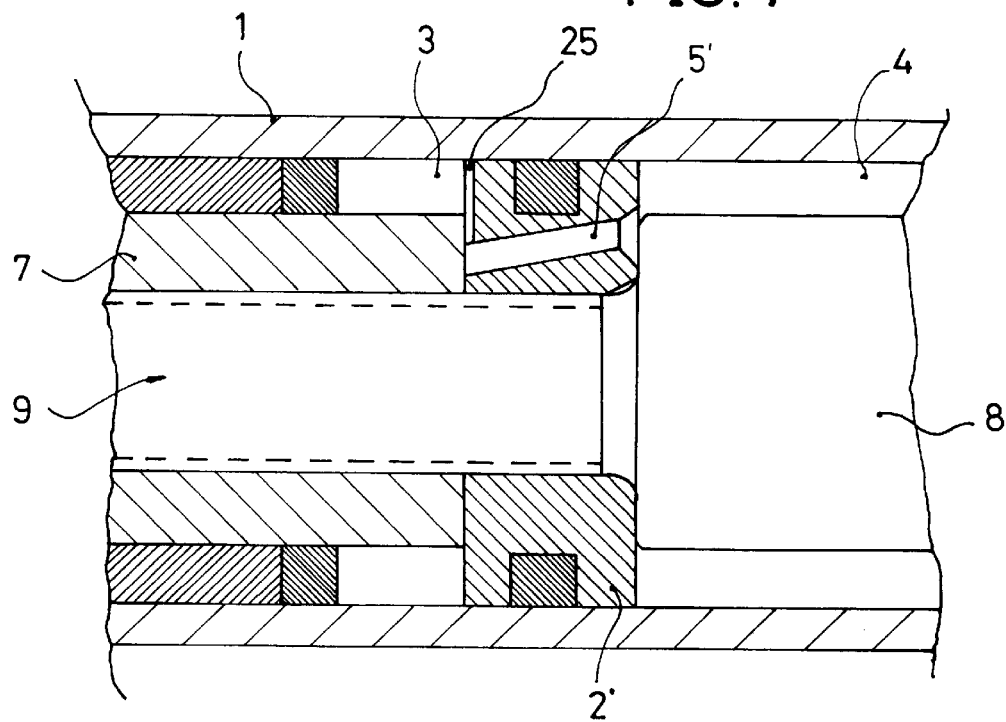
FIG. 7 is a schematic view, on an enlarged scale, of a detail of the device of FIG. 6 in an intermediate position of the rod travel.
Figure 8:
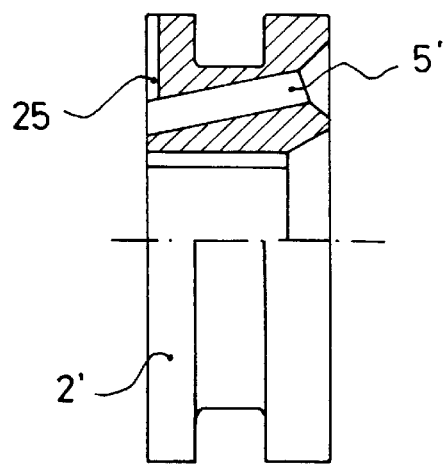
FIGS. 8 and 9 are enlarged-scale views in side elevation and front elevation, respectively, of the piston of the device of FIGS. 6 and 7.
Figure 9:
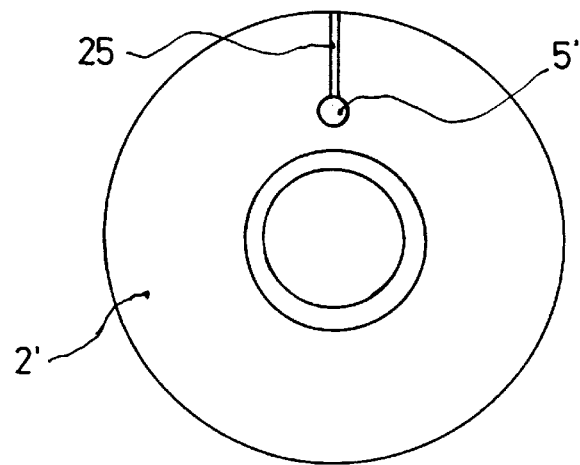

As shown in greater detail in FIGS. 7 to 9, in this case the piston 2' is provided with a single conduit 5', which is inclined with respect to the axis of the piston and which opens on one side into chamber 4 and on the other side against the end of the rod member 7. In a similar way to the previous embodiment, therefore, when the user operates the backrest position release mechanism and, in consequence, the rod member 7 rotates and moves away from rod member 8 and from the piston 2' (by the effect of the threaded connection 9), communication between chambers 3 and 4 is opened through the conduit 5'; the user can then incline the backrest by pressing on it, or let it return to the vertical position biased by the spring 15.

The means for allowing controlled leak of fluid between chambers 3 and 4 consist in this case in a groove 25 machined on one of the faces of the piston 2', which is shown in FIGS. 7 to 9 with exaggeration of its depth and width, for greater clarity. FIG. 9 is a view taken from the left of FIG. 8.

The groove 25 constitutes a permanent communication between chamber 3 and the conduit 5' of the piston; its dimension is such that the pressure exerted by a passenger resting on the backrest of the seat is sufficient to prevent the passage of fluid through the groove, so that under these circumstances the backrest remains in the position fixed by the user; however, in the absence of an outer force on the backrest, the pressure in chamber 4 due to the action of the spring 15 provokes a small flow of fluid from chamber 4 to chamber 3, through the conduit 5', and the groove 25, so that the backrest returns, as in the previous case, to the vertical position.

The existance of the groove 25 also means that if a user presses the backrest forcibly it can even be inclined slowly without operating the release mechanism; the groove 25 and the strength of the spring 15 are nevertheless so dimensioned that this occurs only if a considerable force is applied, so that there is no danger of the backrest lowering slowly during normal use thereof.

The groove can be of any shape and size, depending on the rigidity chosen for the spring 15 and other design parameters; by way of example, in one specific case a 0.07 mm depth slot of triangular section was used.

Figure 10:
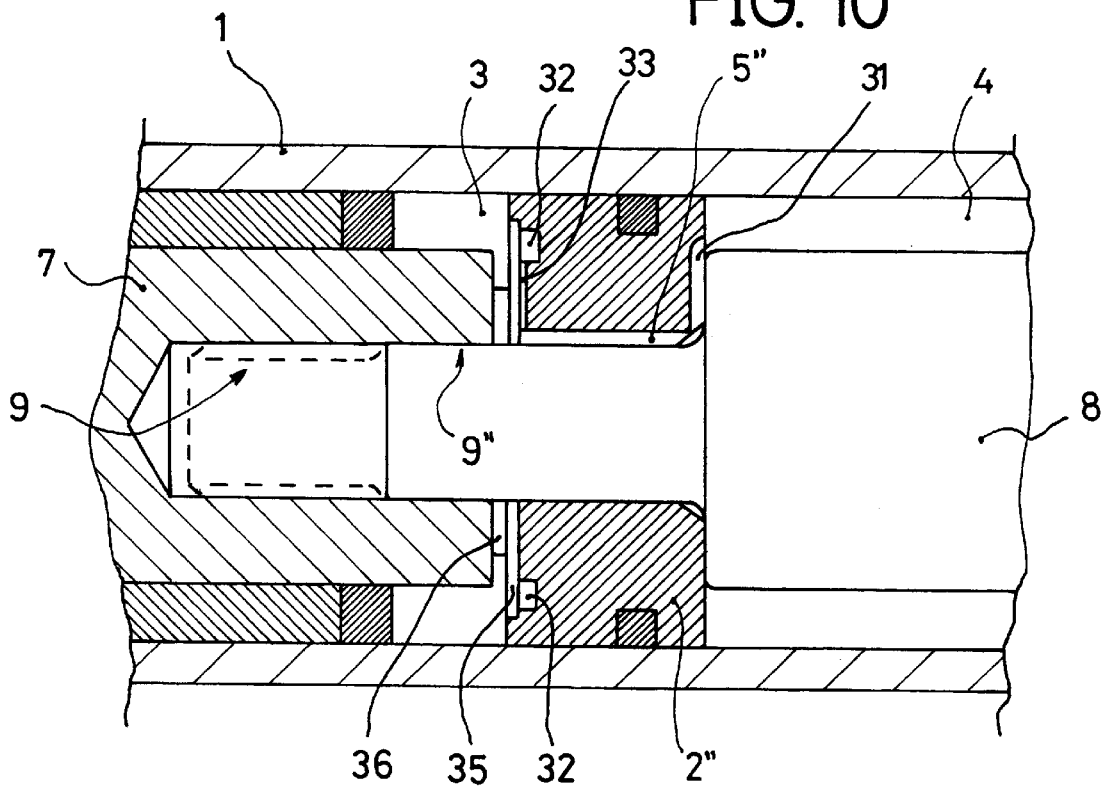
FIG. 10 is a schematic section similar to FIG. 7, showing another different embodiment of the fluid-passage conduits between the chambers and of the means for allowing a controlled leak.
Figure 11:
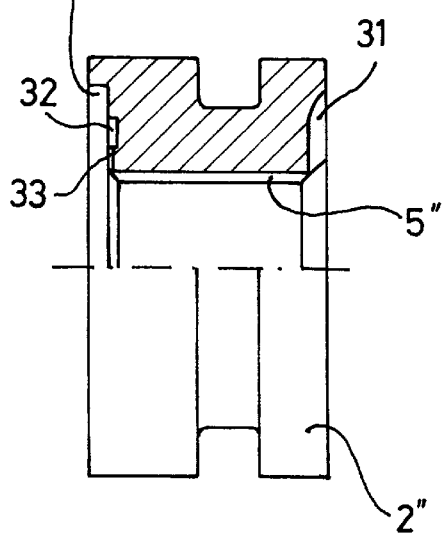
FIGS. 11 and 12 are enlarged-scale views in side elevation and in front elevation, respectively, of the piston corresponding to the embodiment of FIG. 10.
Figure 12:
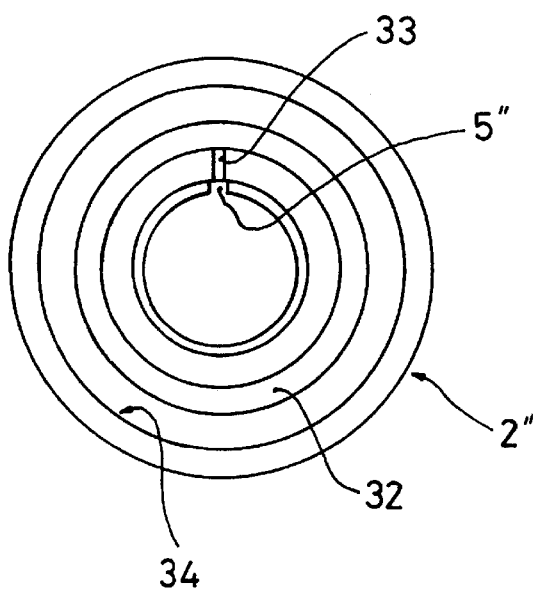

FIGS. 10 to 12 correspond to a third embodiment of the invention. In this case the connection between the two rod members, in addition to a threaded section 9 with structure and function identical to those of the previous cases, has a smooth part 9" which ensures good alignment of the two rod members; the piston 2" is then fitted under pressure on the rod member 8, instead of being screwed on as in the previous embodiments.

The piston 2" also has a conduit 5" for the passage of fluid between the two chambers, being in this case formed by a longitudinal groove formed in the inner cylindrical wall of the piston, and leading on one side to a radial groove 31 which opens in chamber 4 and, on the other side, to an annular groove 32, through a small radial groove 33. On the face of the piston 2" with the annular groove 32 there is likewise a seat 34 (FIG. 11) for a relatively elastic washer 35 (FIG. 10) which normally closes off the passage of oil between chamber 3 and the annular groove 32. This washer 35 has a function similar to that of the washers 12,13 described in the first embodiment of the invention; in the absence of outer forces, the passage of oil from chamber 3 towards chamber 4 is impossible, owing to blockage by the washer 35, while the passage of oil from chamber A towards chamber 3 (and therefore the movement of the rod towards the right in FIG. 10) is possible thanks to the elasticity of the washer 35, which can deform elastically, in a way similar to that described for washers 12,13 of the first embodiment, under the effect of the force exerted by the spring 15 (FIGS. 1 and 6).

In this situation (which has not been shown, due to its similarity to that shown in FIG. 5 for the first embodiment), the passage of fluid through the groove 31, the conduit 5" and the grooves 32 and 33 is limited by the small dimensions of the radial groove 33; the backrest consequently returns to the vertical position slowly.

Adjacent to the washer 35 is another washer 36, of smaller outer diameter, to separate the groove 32 from the point of application of force on the washer 35, thus facilitating deformation of the latter. Alternatively, the same effect can be achieved by an undercut on the end of the rod member 7.

The washers 35,36 and the grooves of the piston form part, in this case, of the means for allowing a controlled leak of fluid from chamber 4 to chamber 3. The annular configuration of the groove 32 permits an increase and circumferential distribution of the force on the washer 35, thus facilitating its elastic deformation.

As in the previous cases, when the passenger wishes to change the position of the backrest he acts indirectly upon the threaded connection 9, causing a distancing between the adjacent ends of the rod members 7 and 8 and the separation of the washer 35 from its seat 34, so that the fluid can circulate freely between chambers 3 and 4 through the annular groove 32, the conduit 5" and the radial groove 31. The passenger pushes the backrest to incline it (overcoming the force exerted by the spring 15), the oil circulates towards chamber 4, and the rod moves towards the left (inclination of the backrest).

It should be noted that in FIG. 10 the geometrical proportions of the piston have not been respected, this in order to make the drawing more intelligible.

The device of the invention also includes means for filling of fluid inside the cylinder and means for fluidtight closure of the unit once the filling operation has been completed; a description follows, with reference to FIGS. 1 and 6, of two possible embodiments thereof.

In FIGS. 1 and 6, it can be appreciated that the rod member 7 is perforated longitudinally, in such a way that the filling of fluid into the cylinder is carried out therethrough once the piston, rod and fluidtightness parts have been fitted.

In the case of FIG. 1, the fluid penetrates slowly into the cylinder through the threaded connection 9; preferably, however, a milled plane or a groove 26 is formed on one of the parts of the connection, as shown in FIG. 6, to facilitate the passage of fluid towards the inside of the cylinder and the exit of air towards the outside.

Once the cylinder has been filled, the unit is sealed in a fluidtight manner. For this purpose, recourse can be had (FIG. 1) to a bolt 27 provided with a smooth-shanked part and a circumferential groove in which a fluidtightness gasket 23 is housed.

A layout such as that shown in FIG. 6 is nevertheless preferable, said layout including a ball 29 which is dropped inside the rod member 7, displacing the excess fluid and remaining resting in fluidtight manner against a suitable seat formed on the wall thereof. A bolt 30 is then fitted and pressed against the ball to keep it in position.

Although this last closure system has been shown and described with reference to FIG. 6, it is clear that it can be applied in identical manner to a device such as that of FIG 11.

Finally, it should be mentioned that the system of operation for releasing the device, constituted by the bushing 18 with the blade 19 and the torsion spring 22 in FIG. 1, can also be implemented in a different way: in the case of FIG. 6, the bushing 18 has a blade 19" which is associated with a traction cable (not shown) linked to a lever used by the passenger, the system for the return of the bushing being constituted by a coil spring (not shown) which works under compression between the blade 19" and the housing 17 of the device.

Alternatively, the rod member 7 could be unperforated axially (as can be seen on the left part of FIG. 10), which facilitates machining thereof, and fluid filling could be implemented from chamber 4 during assembly of the unit, as the two previously coupled rod members are inserted into the cylinder 1.

As can be appreciated, the device described is an intelligent mechanism which automatically returns the seat to a certain initial position when there is no passenger occupying the seat.

The same technical problem described in the present specification, that is, that of a mechanical part driven hydraulically returning of itself to a predetermined position in the absence of an outer force, arises in many other fields of the technique, for which reason the invention is not necessarily limited to the sphere of vehicle seats.

I claim:

1. Automatic-return hydraulic device for adjusting the position of a seat or backrest in a vehicle seat, comprising
   a fluidtight cylinder having an interior loaded with a fluid and including a piston arranged in said interior to divide said interior into two chambers of variable volume, said piston having at least one conduit for enabling the passage of the fluid from one chamber to the other,
   a rod on which said piston is mounted, said rod having an end projecting from said cylinder and being adapted to be coupled to a movable part of the seat or backrest,
   elastic means for biasing said rod and consequently said piston in a predetermined direction, which tends to cause an increase of pressure in one of the chambers,
   said rod comprising two aligned rod members, said piston being attached to a first one of said rod members, said rod members being provided with means for mutual adjustable coupling in order to move their adjacent ends towards each other and apart from each other, and
   means for allowing a controlled leak of fluid through said at least one conduit of said piston from one chamber to the other under the action of said elastic means when said rod members are adjacent each other such that in the absence of external forces acting on the device, the fluid flows from one chamber to the other and as a result, said piston and said first rod member move slowly towards one side causing the movable part of the seat or backrest to return to a predetermined position.

2. Hydraulic device, as claimed in claim 1, wherein said means of mutual adjustable coupling include a threaded spigot provided at one end of the first rod member, which cooperates with a threaded bore provided on the adjacent end of a second one of the rod members, and means to provoke at the will of the user the rotation of the second rod member in such a way that the adjacent ends of both of the rod members move away from each other, thus totally opening the at least one conduit for the flow of fluid between the chambers.

3. Hydraulic devil, as claimed in claim 1, wherein said means for allowing a controlled leak of fluid include means for opening and closing the piston conduits when the adjacent ends of the rod members move away from each other and towards each other, respectively, constituted by at least one washer of elastically flexible material fitted around one of the rod members and adjacent to said piston, and an undercut formed on the other rod member, which allows the elastic deformation of said at least one washer as a consequence of a pressure increase in one of the chambers.

4. Hydraulic device, as claimed in claim 3, wherein said at least one washer comprises two washers arranged adjacent to one another.

5. Hydraulic device, as claimed in claim 3, wherein said at least on washer is made of quench-hardened steel for springs.

6. Hydraulic device, as claimed in claim 4, wherein said washers have a thickness of approximately 0.1 mm and 0.3 mm, respectively.

7. Hydraulic device, as claimed in claim 3, further comprising an inner spring arranged between a cavity of the piston and the at least one washer.

8. Hydraulic device, as claimed in claim 1, wherein said at least one conduit comprises a single conduit and said means for allowing a controlled leak of fluid comprise a radial groove formed in the piston, which connects one end of the conduit with a first one of said chambers.

9. Hydraulic device, as claimed in claim 8, wherein the conduit for the passage of fluid between one chamber and the other is inclined with respect to an axis of the piston, with one of its ends always in communication with a second one of said chambers and its opposite end closed over most of its surface by the end of a second one of the rod members, and in communication with said first chamber solely through said groove, in the absence of external forces acting on the device.

10. Hydraulic device, as claimed in claim 1, further comprising
    means for filling fluid into said interior of said cylinder and fluidtight closure means for closing said interior of said cylinder once the filling operation has been completed,
    said means for filling fluid comprising an axial through-orifice provided on a second one of the rod members and a longitudinal undercut formed in the first rod member, and
    said fluidtight closure means including a ball which fits against a suitable seat machined inside said axial through-orifice, and a bolt for tightening the ball against said seat.

11. The hydraulic device of claim 1, further comprising actuating means for acting upon a second one of said rod members in order to move said rod members apart from one another and provide a higher flow of fluid through said at least one conduit and thereby allow adjustment of the position of the movable part of the seat or backrest.

12. Automatic-return hydraulic device for adjusting the position of the seat or backrest in vehicle seats, comprising
    a fluidtight cylinder having an interior loaded with a fluid and including a piston arranged in said interior to divide said interior into first and second chambers, said piston having at least one conduit for enabling the flow of the fluid between said first and second chambers
    a first rod member on which said piston is mounted, said first rod member having an end projecting from said cylinder and being adapted to be coupled to a movable part of the seat or backrest,
    a second rod member movably coupled to said first rod member, said first and second rod members having a first position in which said first and second rod members are apart from one another and a second position in which said first and second rod members are adjacent one another,
    elastic means for biasing said first rod member and said piston in a predetermined direction to cause an increase of pressure in said first chamber, and
    means for allowing a controlled leak of fluid through said at least one conduit of said piston from said first chamber to said second chamber under the action of said elastic means when said first and second rod members in said second position such that in the absence of external forces on said rod acting on the device, the fluid flows from said first chamber to said second chamber and as a result, said piston and said first rod member move slowly towards one side causing the movable part of the seat or backrest to return to a predetermined position.

13. The hydraulic device of claim 12, wherein said first rod member includes a threaded spigot provided at one end and said second rod member includes a threaded bore arranged to mate with said threaded spigot of said first rod member.

14. The hydraulic device of claim 13, further comprising means for enabling rotation of said second rod member to thereby cause said first and second rod members to separate from each other.

15. The hydraulic device of claim 12, wherein said at least one conduit comprises a single conduit and said means for allowing a controlled leak of fluid comprise a radial groove formed in a radial lateral surface of said piston and connecting said conduit to said second chamber.

16. The hydraulic device of claim 15, wherein said conduit is inclined with respect to an axis of said piston, said conduit having a first end in continual communication with said first chamber and a second end closed over most of its surface by an end of said second rod member, said conduit being in communication with said second chamber solely through said groove in the absence of external forces acting on the device.

17. The hydraulic device of claim 12, further comprising
    filling means for filling said interior of said cylinder with the fluid, and
    closure means for closing said interior of said cylinder once said interior of said cylinder has been filled.

18. The hydraulic device of claim 17, wherein said first rod member includes a threaded spigot provided at one end and said second rod member includes a threaded bore arranged to mate with said threaded spigot of said first rod member, said filling means comprising an axial through-orifice provided on said second rod member and a longitudinal undercut formed in said threaded spigot of said first rod member, said closure means including a ball which fits against a suitable seat machined inside said axial through-orifice, and a bolt for tightening said ball against said seat.

19. The hydraulic device of claim 12, wherein said at least one conduit is continually unobstructed such that fluid continuously flows between said first and second chambers upon a difference in pressure between said first and second chambers.

20. The hydraulic device of claim 12, further comprising actuating means for acting upon said second rod member in order to move said rod members to said first position and provide a higher flow of fluid through said at least one conduit and thereby allow adjustment of the position of the movable part of the seat or backrest.

21. The hydraulic device of claim 1, wherein said piston engages only with said first rod member and not with said second rod member such that said first rod member and said piston are movable together relative to said second rod member.

22. The hydraulic device of claim 1, wherein said first rod member is coupled to the movable part of the seat or backrest on a first side of said piston and extends through said piston to be adjustably coupled to said second rod member on a second side of said piston opposite to said first side of said piston.

23. The hydraulic device of claim 12, wherein said piston engages only with said first rod member and not with said second rod member such that said first rod member and said piston are movable together relative to said second rod member.

24. The hydraulic device of claim 12, wherein said first rod member is coupled to the movable part of the seat or backrest on a first side of said piston and extends through said piston to be adjustably coupled to said second rod member on a second side of said piston opposite to said first side of said piston.

* * * * *